(12) United States Patent
Kim et al.

(10) Patent No.: US 8,486,162 B2
(45) Date of Patent: Jul. 16, 2013

(54) REFORMER FOR FUEL CELL SYSTEM AND FUEL CELL SYSTEM HAVING THE SAME

(75) Inventors: Ju-Yong Kim, Suwon-si (KR); Hong-Sup Lim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 2188 days.

(21) Appl. No.: 11/065,800

(22) Filed: Feb. 25, 2005

(65) Prior Publication Data
US 2005/0191533 A1 Sep. 1, 2005

(30) Foreign Application Priority Data
Feb. 26, 2004 (KR) .................. 10-2004-0012966

(51) Int. Cl.
*B01J 7/00* (2006.01)
*B01J 8/00* (2006.01)
*C01B 6/24* (2006.01)

(52) U.S. Cl.
USPC .............................. 48/61; 423/644; 422/625

(58) Field of Classification Search
USPC ............................................................. 48/61
See application file for complete search history.

(56) References Cited

U.S. PATENT DOCUMENTS

| | | | | |
|---|---|---|---|---|
| 5,635,439 A | * | 6/1997 | Fukui et al. | 502/328 |
| 6,165,633 A | * | 12/2000 | Negishi | 429/17 |
| 2001/0005500 A1 | * | 6/2001 | Schuessler et al. | 423/652 |
| 2002/0045077 A1 | * | 4/2002 | Kotani et al. | 429/19 |
| 2004/0148858 A1 | * | 8/2004 | Yamamoto et al. | 48/127.9 |

FOREIGN PATENT DOCUMENTS

| | | | |
|---|---|---|---|
| CN | 1428884 | | 7/2003 |
| JP | 02280838 A | * | 11/1990 |
| JP | 09-306525 | | 11/1997 |
| JP | 10-021942 | | 1/1998 |
| JP | 2002-50381 | | 2/2002 |
| JP | 2002-226202 | | 8/2002 |
| JP | 2002-242989 | | 8/2002 |
| JP | 2003-048701 | | 2/2003 |
| JP | 2004-006265 | | 1/2004 |
| WO | WO 03082460 A1 | * | 10/2003 |

OTHER PUBLICATIONS

English Language Abstract of JP 02-280838 A (Nov. 24, 2009).*
Certified Translation of JP 02-280838 A, (Dec. 2009).*
Patent Abstracts of Japan, Publication No. 2002-050381, dated Feb. 15, 2002, in the name of Masanao Yasugata.
Patent Abstracts of Japan for Publication numer: 2002-226202; Date of publication of application: Aug. 14, 2002, in the name of Yukio Yamamoto et al.

* cited by examiner

*Primary Examiner* — Matthew Merkling
(74) *Attorney, Agent, or Firm* — Christie, Parker & Hale, LLP

(57) ABSTRACT

A reformer of a fuel cell system and a fuel cell system including a reformer are disclosed. The reformer includes a reformation unit comprising a pipe through which fuel passes. The pipe is formed from a material adapted to induce a catalytic reformation reaction in the pipe. The reformer includes a heat source unit for heating and evaporating the fuel by heating the pipe. The fuel cell system includes such a reformer, a stack for generating electricity through an electrochemical reaction between oxygen and hydrogen, a fuel supply unit, and an air supply unit.

13 Claims, 4 Drawing Sheets

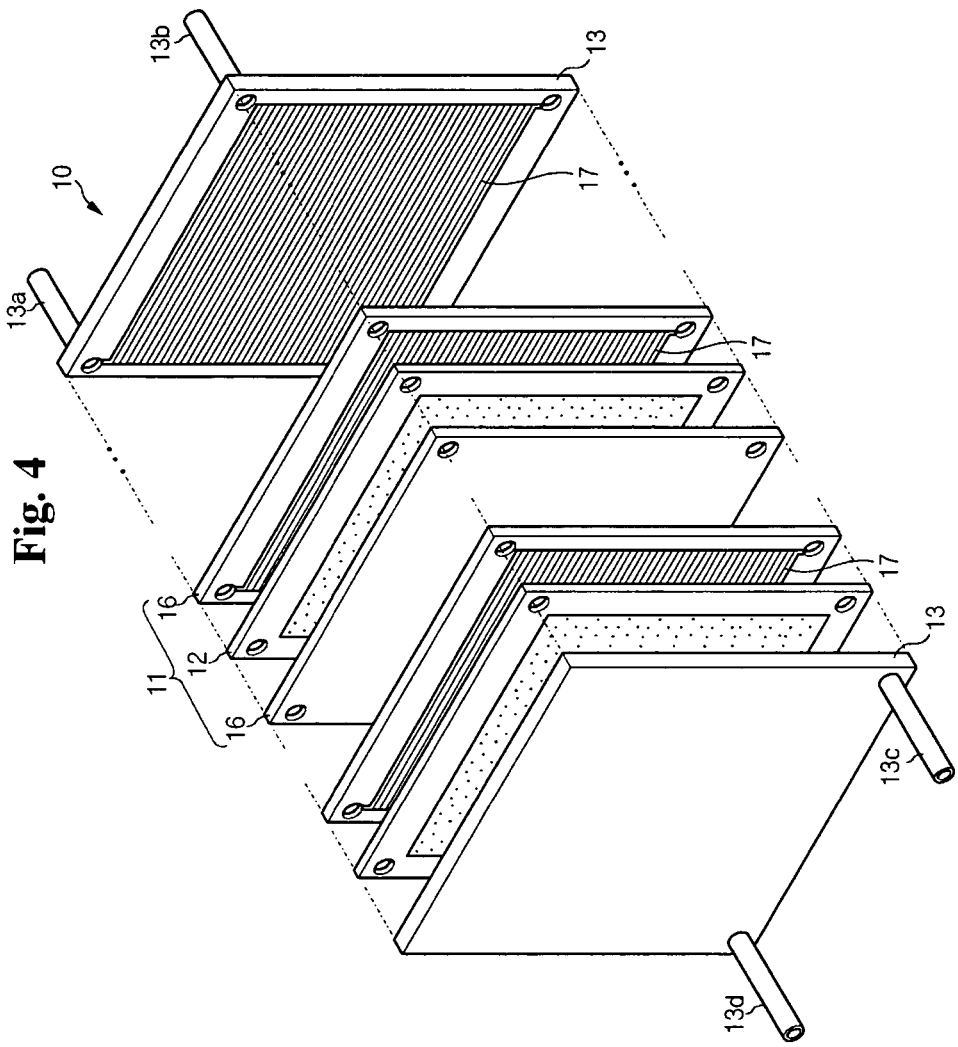

REFORMER FOR FUEL CELL SYSTEM AND FUEL CELL SYSTEM HAVING THE SAME

CROSS-REFERENCE TO RELATED APPLICATION

This application claims the benefit of and priority to Korean Patent Application No. 10-2004-0012966, filed on Feb. 26, 2004 in the Korean Intellectual Property Office, the entire disclosure of which is incorporated herein by reference.

FIELD OF THE INVENTION

The present invention relates to a fuel cell system, and more particularly, to a reformer structure of a fuel cell system.

BACKGROUND OF THE INVENTION

A fuel cell is a system for producing electric power. In a fuel cell, chemical energy is directly converted into electric energy by using an electro-chemical reaction between oxygen and the hydrogen contained in a hydrocarbon-group material such as methanol, ethanol, or natural gas. Particularly, the fuel cell system is advantageous in that both the electric power generated through the electrochemical reaction between oxygen and hydrogen without any combustion process and the heat generated as a by-product thereof can be utilized at the same time.

Fuel cells can be classified depending on the type of electrolyte used and their corresponding operating temperatures. For example, a phosphate fuel cell has an operating temperature range of 150 to 200° C., a molten carbonate fuel cell has a higher operating temperature range of 600 to 700° C., a solid oxide fuel cell has a higher operating temperature range of over 1000° C., and a polymer electrolyte membrane fuel cell (PEMFC), and an alkali fuel cell have lower operating temperature ranges of below 100° C. or at room temperature. These different types of fuel cells work using the same basic principles, but differ from one another in their kinds of fuel, operating temperature, catalyst, and electrolyte.

The recently developed polymer electrolyte membrane fuel cell (PEMFC) has excellent output characteristics, a low operating temperature, and fast starting and response characteristics compared to other fuel cells. The PEMFC can be widely applied to mobile power sources used for vehicles, distributed power sources used for homes and buildings, small power sources used for electronic appliances, and the like.

PEMFC fuel cell systems comprise a stack, a reformer, a fuel tank, and a fuel pump. The stack forms a main body of the fuel cell. The fuel pump supplies fuel from the fuel tank to the reformer. The reformer reforms the fuel to generate hydrogen gas and then supplies the hydrogen gas to the stack. Accordingly, the PEMFC fuel cell system supplies the fuel from the fuel tank to the reformer through operation of the fuel pump and reforms the fuel with the reformer to generate hydrogen gas. Then, the stack generates electric energy through an electro-chemical reaction between the hydrogen gas and oxygen.

In contrast, a direct methanol fuel cell (DMFC) can generate electric power by directly supplying liquid fuel containing hydrogen to the stack, and does not require a reformer as is required for a PEMFC.

In the above-noted fuel cell system, the stack which substantially generates electric energy, is structured including a few to a few tens of unit cells, each comprising a membrane-electrode assembly (MEA), with separators (consisting of bipolar plates) provided on both sides thereof. In the MEA, an anode and a cathode are provided opposing one another with an electrolyte layer interposed therebetween. The separator functions as a pathway for providing hydrogen gas and oxygen gas, which are required for a fuel cell reaction, as well as a conductor for connecting the anode and the cathode of each MEA in series. Accordingly, through the separators, the hydrogen gas is supplied to the anode and the oxygen is supplied to the cathode. During this process, an oxidation reaction of the hydrogen gas occurs in the anode, and a reduction reaction of the oxygen occurs in the cathode, so that electric energy, heat, and water can be generated by electron movement occurring at the same time.

The aforementioned reformer converts water and liquid fuel containing hydrogen into the reformed gas rich in hydrogen gas required to generate electric energy in the stack through a catalytic reformation reaction. Also, the reformer reduces harmful materials such as carbon monoxide, which decreases a fuel cell's lifetime, by purifying the reformed gas. For these purposes, the reformer comprises a reformation unit for reforming the fuel to produce hydrogen gas, and a carbon monoxide elimination unit for reducing the amount of carbon monoxide in the reformed gas. The reformation unit converts the fuel into reformed gas rich in hydrogen through a catalytic reaction such as a moisture reformation, a partial oxidation, and a natural reaction. The carbon monoxide elimination unit reduces or eliminates carbon monoxide from the reformed gas through various methods including catalytic reactions such as by a hydrogen gas conversion, by selective oxidation, or by using separators.

In a conventional fuel cell system, the reformation unit is provided with a catalyst layer for reforming mixed fuel containing liquid fuel and water in a reactor. The reformation unit is heated and generates reformed gas rich in hydrogen from the mixed fuel through a catalytic reformation reaction in the catalyst layer.

However, the reformer of the conventional fuel cell system requires a separate process for forming the catalyst layer in the reactor, thereby increasing manufacturing costs. As a result, the cost of the entire system is also increased. In addition, when a metallic reactor is adopted, the reformation catalytic layer is formed on the reactor in such a way that an oxidation film is provided on the surface of the reactor, and then a catalyst solution is doped thereon. This complicates the manufacturing processes and causes the reformation catalytic layer to be easily exfoliated from the surface of the reactor.

SUMMARY OF THE INVENTION

The present invention provides a reformer which has a simple structure and does not require a separate process for forming a catalyst layer, and provides a fuel cell system incorporating such a reformer.

According to one exemplary embodiment of the present invention, there is provided a reformer of a fuel cell system comprising: a reformation unit having a pipe through which fuel passes, the pipe being formed from a material capable of inducing a catalytic reformation reaction; and a heat source unit for heating and evaporating the fuel by heating the pipe.

The pipe may have an inlet for infusing the fuel and an outlet for discharging reformed gas generated by the reformation reaction, and the pipe may have a rough inner surface.

The pipe may be formed from a material selected from the group 8, 9, 10, 11 and 12 elements, or alloys thereof.

The rough inner surface of the pipe may be formed by oxidization with air followed by reduction with hydrogen.

The heat source unit may include a heating member making contact with the pipe to heat the pipe.

The heat source unit may include a heating plate making contact with the pipe and a heating coil installed on the heating plate, and the heating plate may have a coupling groove into which the pipe is fitted.

The pipe may be bent in a zigzag shape.

The reformer may further comprise at least one carbon monoxide reduction unit connected to the pipe for reducing the concentration of carbon monoxide in the reformed gas generated from the reformer.

The rough inner surface of the pipe may have protrusions having a height of about 2 to 20 nm.

In addition, according to another exemplary embodiment of the present invention, there is provided a fuel cell system comprising: a stack for generating electricity through an electrochemical reaction between oxygen and hydrogen; a reformer for generating hydrogen gas by reforming the fuel; a fuel supply unit for supplying the fuel to the reformer; and an air supply unit for supplying the air to the stack, wherein the reformer is as described above.

The fuel supply system may comprise: a first tank for storing liquid fuel containing hydrogen; a second tank for storing water; and a fuel pump connected to the first and second tanks.

The air supply unit may include an air pump for infusing external air to the stack.

The fuel cell system may be a polymer electrolyte membrane fuel cell (PEMFC).

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 is an exploded perspective view illustrating the stack shown in FIG. 1.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

In one embodiment, the present invention adopts a polymer electrode membrane fuel cell (PEMFC) system, in which fuel containing hydrogen is reformed to produce reformed gas rich in hydrogen, and the reformed gas and oxygen are electro-chemically reacted to produce electric energy.

The fuel for generating electricity in the fuel cell system according to the present invention includes water in addition to a hydrocarbon such as natural gas or an alcohol fuel such as methanol or ethanol. Therefore, a mixture of the liquid fuel and the water is hereinafter referred to as mixed fuel. The oxygen may be pure oxygen gas stored in a separate storage container, or simply the oxygen contained in air may be used. Now, an example using atmospheric air will be described.

Figure 1:
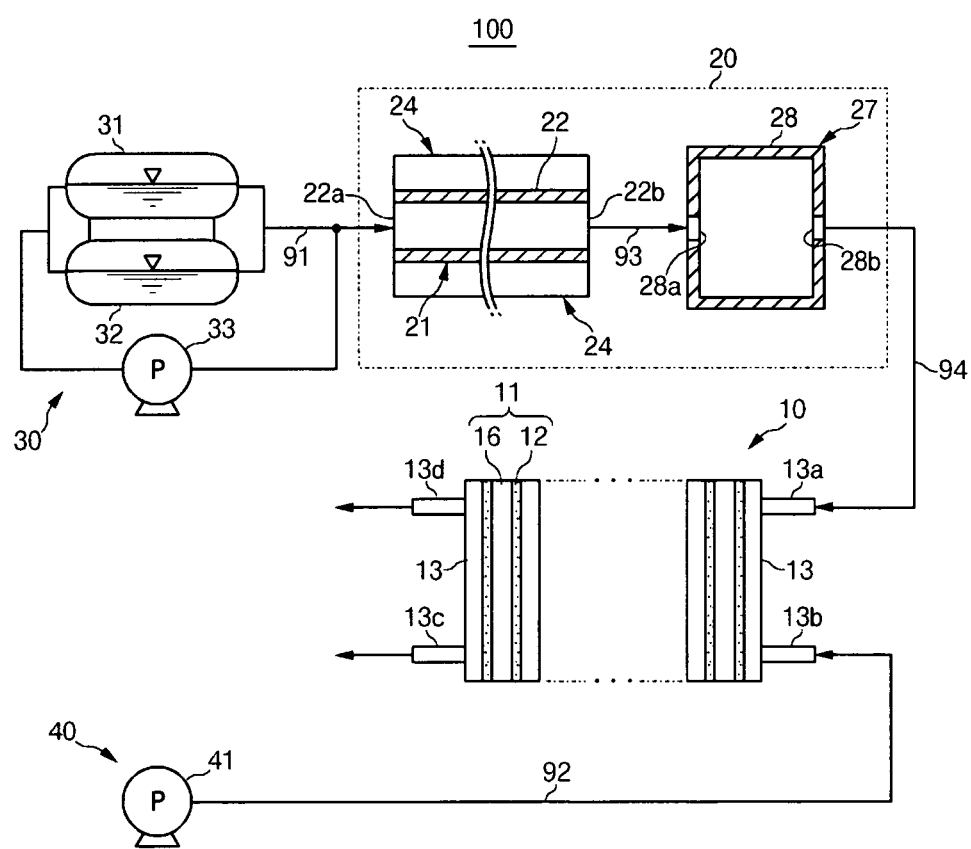
FIG. 1 is a schematic diagram illustrating a fuel cell system according to an exemplary embodiment of the present invention.

FIG. 1 is a schematic diagram illustrating an exemplary fuel cell system according to the present invention.

Basically, a fuel cell system 100 according to the present invention comprises a stack 10 for converting chemical reaction energy between oxygen and hydrogen into electric energy, a reformer 20 for reforming a mixture of fuel containing hydrogen and water to produce reformed gas rich in hydrogen and then supplying the reformed gas to the stack 10, a fuel supply unit 30 for supplying the mixed fuel to the reformer 20, and an air supply unit 40 for supplying atmospheric air to the stack 20.

The fuel supply unit 30 includes a first tank 31 for storing the liquid fuel containing hydrogen, a second tank 32 for storing water, and a fuel pump 33 connected to the first and second tanks 31 and 32, respectively. In this case, the first and second tanks 31 and 32 can be connected to the reformer through a first supply line 91.

The air supply unit 40 includes an air pump 41 for infusing air to the stack 10. The air pump 41 may be connected to the stack 10 via a second supply line 92.

Figure 2:
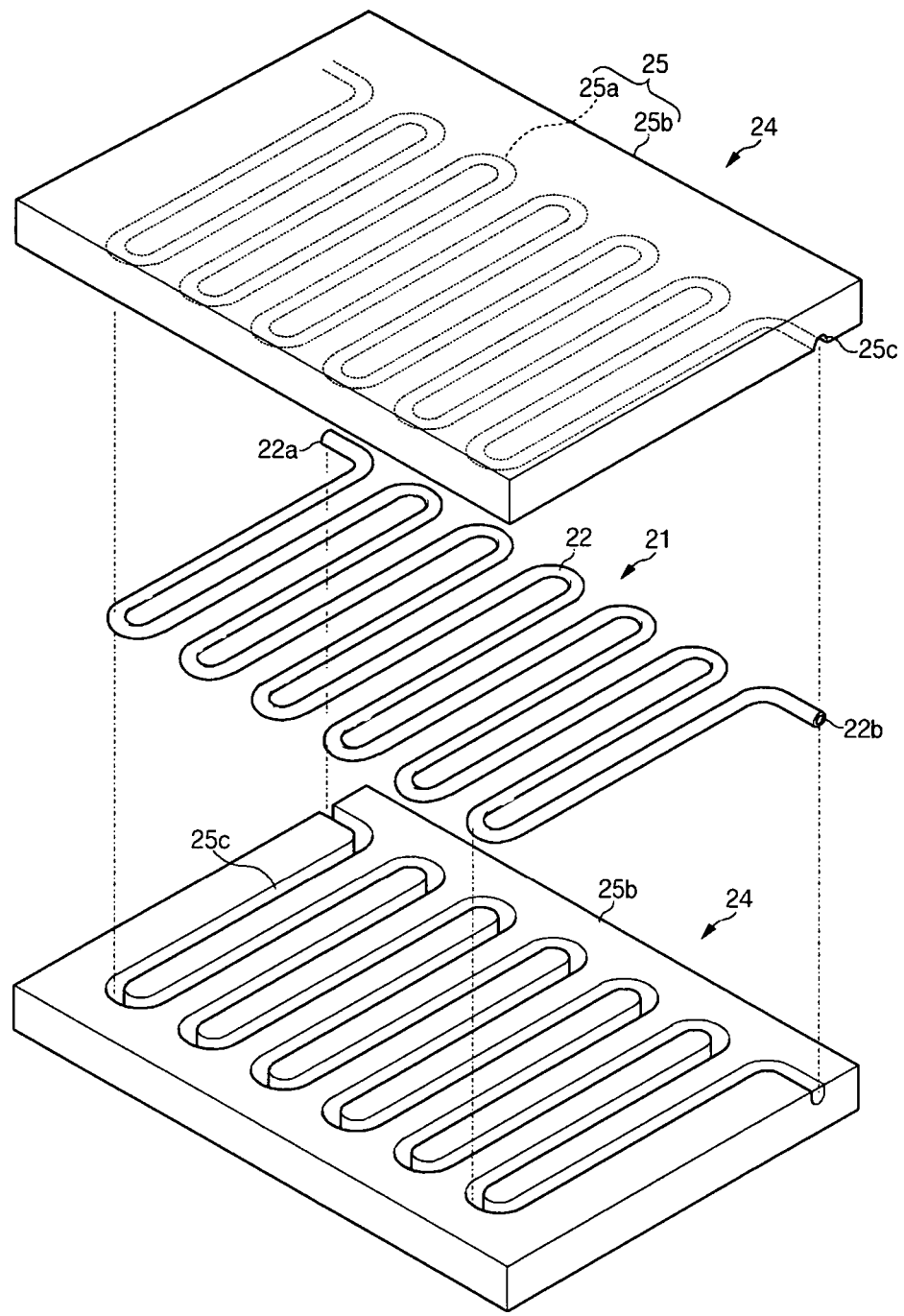
FIG. 2 is an exploded perspective view illustrating an exemplary reformation unit and heat source unit of the invention.

FIG. 2 is an exploded perspective view illustrating a tube-shaped reformation unit and a heat source unit of the reformer 20. Also, FIG. 3 is a cross-sectional view illustrating the tube-shaped reformation unit shown in FIG. 2.

Figure 3:
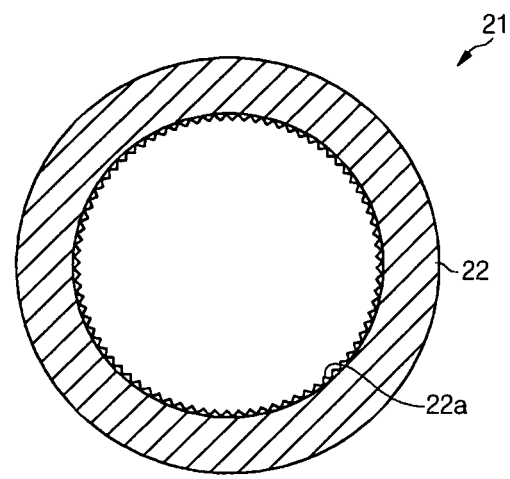
FIG. 3 is a cross-sectional view illustrating the reformation unit shown in FIG. 2.

Referring to FIGS. 1 through 3, the reformer 20 according to the present invention includes a tube-shaped reformation unit 21 for generating the reformed gas rich in hydrogen from the mixed fuel through a catalytic reformation reaction and a heat source unit 24 for heating and evaporating the mixed fuel supplied to the tube-shaped reformation unit 21.

The tube-shaped reformation unit 21 includes a predetermined length of pipe 22 functioning as a fluid transport path through which the mixed fuel can pass. The pipe 22 has an inner diameter of about 1 mm or smaller, and is a circular pipe having both ends opened. The pipe 22 includes an inlet 22a for infusing the mixed fuel supplied from the fuel supply unit 30 into the fluid transport path and an outlet 22b for discharging the reformed gas generated by the reformation reaction in the pipe 22. Preferably, the pipe 22 is provided in a zigzagged or serpentine shape as shown in FIG. 2. However, the shape of the pipe 22 in the tube-shaped reformation unit 21 is not limited by this, and may be a straight line, a coil shape, or other types variously modified according to arrangements of the components consisting of the system 100. Furthermore, while the pipe is described as having a circular cross-section, other shapes are possible for the pipe.

The pipe 22 may be formed from a material capable of inducing a catalytic reformation reaction, for example, a material containing one or more elements selected from the group 8, 9, 10, 11 and 12 elements, and alloys thereof.

More specifically, the pipe according to the present invention may be formed from a material containing one or more elements selected from the group consisting of Cu, Ni, Zn, Pt, Fe, and Co, and alloys thereof. In this case, the inlet 22a of the pipe 22 may be connected to the fuel supply unit 30 via the first supply line 91 as described above.

The pipe 22 has an inner surface onto which relatively minute particles are roughly and irregularly formed to promote the catalytic reaction. The rough inner surface of the pipe can be achieved by using oxide and alkali materials or through a surface oxidation reaction using oxygen followed by a reduction reaction using hydrogen. Particularly, in the latter case, the pipe 22 is heated to a high temperature, and then high temperature oxygen or air is infused into the inside of the pipe 22 to oxidize the inner surface. By this process, minute particles are irregularly and roughly formed on the inner surface to increase the surface area. Then, high temperature hydrogen gas is infused into the inside of the pipe 22 to reduce the inner surface, so that protrusions 22a having both high reactivity and high surface area can be formed. In this case, each protrusion 22a preferably has a height of about 2 to 20 nm.

The aforementioned heat source unit 24 supplies the heat required to generate the reformed gas in the tube-shaped reformation unit 21. For this purpose, the heat source unit 24 comprises heating members 25 that make contact with the upper and lower parts of the pipe 22. Each heating member 25 includes a heating plate 25b with a heating coil 25a. The heat for the heating coil 25a may be provided by an electric power source or some other source of heat. Also, the heating plate 25b has a coupling groove 25c into which the pipe 22 can be fit to make contact with the surfaces of its upper and lower portions. Accordingly, the pipe 22 can be securely fixed onto the heating plate 25b when the pipe 22 is coupled to the coupling groove 25c of the heating plate 25b.

In another embodiment, the heating coil 25a is a pipe through which a heating fluid flows. As one example, the heating fluid comprises the catalytic oxidation reaction products resulting from the reaction between a portion of the liquid fuel and air. For this purpose, the heat source unit 24 may have a flow path for allowing fluid to flow through the inside of the heating plate 25b, and the flow path may be provided with an oxidation catalytic layer consisting of a catalytic material such as platinum (Pt) or ruthenium (Ru).

The reformer 20 may produce additional reformed gas through a water-gas shift reaction (WGS) or a preferential CO oxidation (PROX). Also, the reformer 20 may include at least a carbon monoxide reduction unit 27 for reducing the concentration of the carbon monoxide in the reformed gas.

The carbon monoxide reduction unit 27 comprises a reaction vessel 28 connected to the tube-shaped reformation unit 21, and has a hydrogen gas conversion catalytic layer or a carbon monoxide selective oxidation catalytic layer provided in the inner space of the reaction vessel 28, as is known in the art. The reaction vessel 28 includes an inlet 28a for infusing the reformed gas from the tube-shaped reformation unit 21 into the space of the vessel, and an outlet 28b for discharging the reformed gas which has been catalytically reacted by the catalytic layer in the inner space 10. The outlet 22b of the pipe 22 of the tube-shaped reformation unit 21 can be connected to the inlet 28a of the reaction vessel 28 via a third supply line 93. The outlet 28b of the reaction vessel 28 can be connected to the stack 10 via a fourth supply line 94.

FIG. 4 is an exploded perspective view illustrating the stack structure shown in FIG. 1.

Referring to FIGS. 1 and 4, the stack 10 applied to the present system 100 includes a plurality of electricity generating units 11 for inducing an oxidation/reduction reaction between the reformed gas and the atmospheric air to generate electric energy.

Each electricity generating unit 11 corresponds to a unit cell for generating electricity, and includes a membrane-electrode assembly (MEA) 12 for oxidizing/reducing the reformed gas and oxygen in the air and a separator 16 for supplying the reformed gas and the air to the membrane-electrode assembly 12.

In the electricity generating unit 11, the separators 16 are arranged on both sides of the membrane electrode assembly 12. The stack 10 is constructed with a plurality of electricity generating units 11 arranged in series. Here, the separators 16 positioned at the outermost positions in the stack 10 are called end plates 13.

The membrane-electrode assembly 12 has a typical MEA structure in which electrolyte films are interposed between an anode and a cathode. The anode receives the reformed gas through the separator, and includes a catalytic layer for converting the reformed gas into electrons and hydrogen ions through an oxidation reaction, and a gas diffusion layer for promoting mobility of the electrons and the hydrogen ions. The cathode receives air through the separators 16, and includes a catalytic layer for converting oxygen into electrons and oxygen ions through a reduction reaction and a gas diffusion layer for promoting mobility of the electrons and the oxygen ions. The electrolyte film is a solid polymer electrolyte having a thickness of 50 to 200 $\mu$m, and has an ion exchange function for moving the hydrogen ions generated in the catalytic layer of the anode to the catalytic layer of the cathode.

The separator 16 functions as a conductor for connecting the anode and the cathode of the membrane-electrode assembly 12 in series. Also, the separator 16 functions as a pathway for supplying air and reformed gas necessary for the oxidation/reduction reaction in the membrane-electrode assembly 12 to the anode and the cathode. For this purpose, the surface of the separator 16 has flow channels 17 for supplying the gas necessary for the oxidation/reduction reaction in the membrane-electrode assembly 12.

More specifically, the separators 16 are arranged on both sides of the membrane electrode assembly (MEA) 12 so that they are closely arranged onto the anode and the cathode of the membrane-electrode assembly 12. The separators 16 have flow channels 17 and are arranged to contact the surfaces of the anode and cathode of the membrane-electrode assembly 12, respectively, to supply the reformed gas to the anode and also supply the air to the cathode.

Each end plate 13 is arranged on the outermost side of the stack 10 to function as a separator 16 and also closely adheres to a plurality of electricity generating units 11. Each end plate 13 can be closely adhered to one of the cathode or the anode of the membrane-electrode assembly 12, in particular, with the surface of the end plate 13 closely adhered to the membrane-electrode assembly 12 provided with a flow channel 17 for supplying one of the reformed gas or the air to one of the electrodes.

The end plate 13 includes a first supply pipe 13a for infusing the reformed gas generated from the reformer 20 into the flow channel 17 of the separator 16, a second supply pipe 13b for infusing the air into the flow channel 17, a first discharge pipe 13c for discharging unreacted hydrogen gas remaining in a plurality of electricity generating units 11, and a second discharge pipe 13d for discharging the unreacted air remaining in the plurality of electricity generating units 11. Here, the first supply pipe 13a may be connected to the outlet 28b of the reaction vessel 28 in the carbon monoxide reduction unit 27 via the fourth supply line 94. Also, the second supply pipe 13b may be connected to the air pump 41 in the air supply unit 40 through the second supply line 92.

The operation of the fuel cell system according to an exemplary embodiment of the present invention is described in detail below.

First, the fuel pump 33 starts to operate and the liquid fuel stored in the first tank 31 and the water stored in the second tank 32 are supplied to the inlet 22a of the pipe 22 via the first supply line 91. Then, a mixture of the liquid fuel and the water is infused into the inside of the pipe 22.

At this point, the pipe 22 is heated by the heat from the heat coil 25a of the heating member 25. That is, when a power source or other supply of energy is applied to the heating coil 25a, heat generated by the heating coil 25a is transmitted through the pipe 22.

Therefore, when the mixed fuel flows through the inside of the pipe 22, vaporization occurs due to the heat, and the fuel is catalytically reacted by the reformation catalyst. Thus, a reformed gas rich in hydrogen can be generated from the vaporized fluid due to the catalytic reformation reaction in the pipe 22. Subsequently, the reformed gas is discharged through the outlet 22b of the pipe 22.

The reformed gas discharged through the outlet 22b of the pipe 22 is supplied to the reaction vessel 28 of the carbon monoxide reduction unit 27 via the third supply line 93. In this case, the reformed gas can be supplied to the reaction vessel by the force of the fuel pump 33. Then, in the reaction vessel 28, the concentration of the carbon monoxide in the reformed gas is reduced such as by a water-gas shift (WGS) catalytic reaction or a preferential CO oxidation (PROX) catalytic reaction.

Next, the reformed gas with the reduced concentration of carbon monoxide is supplied to the first supply pipe 13a of the stack 10 via the fourth supply line 94. In this case, the reformed gas can be supplied to the first supply pipe 13a of the stack 10 due to the force of the fuel pump 33.

At the same time, the air pump 41 starts to operate to supply the external air to the second supply pipe 13b of the stack 10 via the second supply line 92.

Accordingly, the reformed gas is supplied via the first supply pipe 13a of the stack 10, and the external air is supplied via the second supply pipe 13b, so that electricity, heat, and water are generated according to following chemical reactions.

anode electrode reaction: $H_2 \rightarrow 2H^+ + 2e^-$
cathode electrode reaction: $\frac{1}{2}O_2 + 2H^+ + 2e^- \rightarrow H_2O$
entire reaction: $H_2 + \frac{1}{2}O_2 \rightarrow H_2O + $ electric current + heat Referring to the chemical reactions, the reformed gas is supplied to the anode of the membrane-electrode assembly 12 through the separators 16, and the electricity is supplied to the cathode. When the reformed gas flows into the anode, the hydrogen is catalytically converted into electrons and protons (hydrogen ions) by the catalytic layer. Also, when the protons move through the electrolyte film, electrons, oxygen ions, and the moved protons are combined in the cathode with the help of the catalyst to produce water. At this point, since the electrons generated in the anode cannot move through the electrolyte film, they move to the cathode via external circuitry. Through these processes, electricity, water, and heat are generated.

According to the fuel cell system of the present invention, there is provided a simple structure capable of inducing a catalytic reformation reaction by using a pipe. Therefore, it is possible to exclude a separate procedure for forming a conventional reformation catalytic layer, so that manufacturing costs can be reduced, reducing the cost of the entire system. In addition, in comparison with the conventional art, since there is no exfoliation of the catalytic reformation layer, it is possible to further improve performance and efficiency of the entire system. It is also possible to produce a system of a more compact size.

Although embodiments of the present invention have been described in detail hereinabove in connection with certain exemplary embodiments, it should be understood that the invention is not limited to the disclosed exemplary embodiments, but, on the contrary is intended to cover various modifications and/or equivalent arrangements included within the spirit and scope of the present invention, as defined in the appended claims.

What is claimed is:

1. A fuel cell system comprising:
a stack for generating electricity through an electro-chemical reaction between oxygen and hydrogen;
a reformer for generating hydrogen gas by reforming a fuel;
a fuel supply unit for supplying the fuel to the reformer; and
an air supply unit for supplying air to the stack, wherein the reformer comprises a reformation unit comprising a pipe formed from a material adapted to induce a catalytic reformation reaction, and a heat source unit comprising a semi-circular groove adapted to receive the pipe for heating the reformation unit.

2. The fuel cell system of claim 1, wherein the fuel supply unit comprises:
a first tank for storing liquid fuel containing hydrogen;
a second tank for storing water; and
a fuel pump connected to the first and second tanks.

3. The fuel cell system of claim 1, wherein the air supply unit comprises an air pump for infusing atmospheric air to the stack.

4. The fuel cell system of claim 1, wherein the pipe comprises an inlet for infusing the fuel and an outlet for discharging the reformed gas.

5. The fuel cell system of claim 4, wherein the pipe has a rough inner surface.

6. The fuel cell system of claim 4, wherein the pipe is formed from a material selected from the group 8, 9, 10, 11 and 12 elements, and alloys thereof 7. The fuel cell system of claim 5, wherein the inner surface of the pipe is oxidized by air and reduced with hydrogen to produce the rough surface.

8. The fuel cell system of claim 4, wherein the heat source unit comprises a heating member that contacts the pipe.

9. The fuel cell system of claim 8, wherein the heating member comprises a heating plate that makes contact with the pipe and a heating coil that contacts the heating plate.

10. The fuel cell system of claim 4, wherein the pipe has a zigzag shape.

11. The fuel cell system of claim 1, wherein the reformer further comprises at least one carbon monoxide reduction unit for reducing the concentration of carbon monoxide in the reformed gas.

12. The fuel cell system of claim 11, wherein the fuel cell system is a polymer electrolyte membrane fuel cell (PEMFC) system.

13. The fuel cell system of claim 4, wherein the pipe is formed from a material selected from the group consisting of Cu, Ni, Zn, Pt, Fe and Co, and alloys thereof.

* * * * *

UNITED STATES PATENT AND TRADEMARK OFFICE
CERTIFICATE OF CORRECTION

| | | |
|---|---|---|
| PATENT NO. | : 8,486,162 B2 | Page 1 of 1 |
| APPLICATION NO. | : 11/065800 | |
| DATED | : July 16, 2013 | |
| INVENTOR(S) | : Ju-Yong Kim et al. | |

It is certified that error appears in the above-identified patent and that said Letters Patent is hereby corrected as shown below:

On the Title Page

Item (57) Abstract, line 8            Delete "electrochemical",
                                      Insert --electro-chemical--

In the Claims

Col. 8, line 39, Claim 6              Delete "thereof",
                                      Insert --thereof.--

Signed and Sealed this
Twenty-fourth Day of February, 2015

Michelle K. Lee
*Deputy Director of the United States Patent and Trademark Office*